United States Patent
Chambers et al.

(10) Patent No.: US 9,694,737 B2
(45) Date of Patent: Jul. 4, 2017

(54) VEHICLE HEADLIGHT CONTROL SYSTEM AND METHOD

(71) Applicant: Nissan North America, Inc., Franklin, TN (US)

(72) Inventors: Jeremy Chambers, Casco, MI (US); Roy Goudy, Farmington Hills, MI (US); Neal Probert, Farmington Hills, MI (US); Andy Christensen, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 95 days.

(21) Appl. No.: 14/305,599

(22) Filed: Jun. 16, 2014

(65) Prior Publication Data

US 2015/0360601 A1    Dec. 17, 2015

(51) Int. Cl.
*B60Q 1/08* (2006.01)
*B60Q 1/14* (2006.01)

(52) U.S. Cl.
CPC ............ *B60Q 1/143* (2013.01); *B60Q 1/085* (2013.01); *B60Q 2300/054* (2013.01); *B60Q 2300/32* (2013.01); *B60Q 2300/42* (2013.01)

(58) Field of Classification Search
CPC  B60Q 1/08; B60Q 2300/42; B60Q 2300/056; B60Q 1/143; B60Q 1/085; B60Q 2300/054; B60Q 2300/32
See application file for complete search history.

(56) References Cited

U.S. PATENT DOCUMENTS

| 4,352,088 A | 9/1982 | Tsunoda |
| 4,644,327 A | 2/1987 | Patterson |

(Continued)

FOREIGN PATENT DOCUMENTS

| EP | 1962255 A1 | 8/2008 |
| JP | S59-102634 A | 6/1984 |

(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

*Primary Examiner* — Redhwan K Mawari
*Assistant Examiner* — Alan D Hutchinson
(74) *Attorney, Agent, or Firm* — Global IP Counselors, LLP

(57) ABSTRACT

A vehicle headlight control system includes a headlight, a positioning system, a receiver, and a controller. The positioning system is configured to generate host vehicle information including a host vehicle location and a host vehicle trajectory. The receiver is configured to receive remote vehicle information including a remote vehicle location and a remote vehicle trajectory. The controller is configured to calculate a remote vehicle distance from the host vehicle location based on the remote vehicle information and the host vehicle information, determine whether the remote vehicle distance is less than a predetermined distance, and automatically operate the headlight in a first setting while the remote vehicle distance is determined to be less than the predetermined distance.

18 Claims, 8 Drawing Sheets

(56) References Cited

U.S. PATENT DOCUMENTS

| | | | |
|---|---|---|---|
| 4,706,072 A | | 11/1987 | Ikeyama |
| 5,247,440 A | * | 9/1993 | Capurka ................ B60Q 1/143 701/49 |
| 5,788,336 A | | 8/1998 | Trovato et al. |
| 5,845,250 A | | 12/1998 | Vogten |
| 5,939,976 A | | 8/1999 | Sasaki et al. |
| 5,940,010 A | | 8/1999 | Sasaki et al. |
| 5,979,586 A | | 11/1999 | Farmer et al. |
| 6,008,741 A | | 12/1999 | Shinagawa et al. |
| 6,366,207 B1 | | 4/2002 | Murphy |
| 6,615,137 B2 | | 9/2003 | Lutter et al. |
| 6,700,504 B1 | | 3/2004 | Aslandogan et al. |
| 6,720,898 B1 | | 4/2004 | Ostrem |
| 6,791,471 B2 | | 9/2004 | Wehner et al. |
| 6,810,328 B2 | | 10/2004 | Yokota et al. |
| 7,274,288 B2 | | 9/2007 | Nagata |
| 8,000,897 B2 | | 8/2011 | Breed et al. |
| 8,175,796 B1 | | 5/2012 | Blackburn et al. |
| 8,340,894 B2 | | 12/2012 | Yester |
| 8,466,807 B2 | | 6/2013 | Mudalige |
| 8,548,729 B2 | | 10/2013 | Mizuguchi |
| 8,577,550 B2 | | 11/2013 | Lu et al. |
| 8,587,418 B2 | * | 11/2013 | Mochizuki ............ B60Q 9/008 340/435 |
| 8,639,426 B2 | | 1/2014 | Dedes et al. |
| 8,717,192 B2 | | 5/2014 | Durekovic et al. |
| 2009/0033540 A1 | | 2/2009 | Breed et al. |
| 2009/0140887 A1 | | 6/2009 | Breed et al. |
| 2009/0198412 A1 | | 8/2009 | Shiraki |
| 2010/0169009 A1 | | 7/2010 | Breed et al. |
| 2012/0016581 A1 | | 1/2012 | Mochizuki et al. |
| 2012/0218093 A1 | | 8/2012 | Yoshizawa et al. |
| 2013/0116915 A1 | | 5/2013 | Ferreira et al. |
| 2013/0179047 A1 | | 7/2013 | Miller et al. |
| 2013/0278440 A1 | | 10/2013 | Rubin et al. |
| 2014/0029792 A1 | * | 1/2014 | Kato ....................... B60Q 1/08 382/103 |
| 2014/0246975 A1 | * | 9/2014 | Futamura ............... B60Q 1/143 315/82 |

FOREIGN PATENT DOCUMENTS

| | | |
|---|---|---|
| JP | S61-253238 A | 11/1986 |
| JP | 2000-127796 A | 5/2000 |
| JP | 2001-118199 A | 4/2001 |
| JP | 2003-51099 A | 2/2003 |
| WO | 03091966 A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for The Degree Doctor of Philosophy in the Graduate School of the Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

Pontus Larsson et al., Emotional and Behavioral Response to Auditory Icons and Earcons in Driver-vehicle Interfaces (Sweden, Paper No. 09-0104).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harber, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14,2003).

* cited by examiner

VEHICLE HEADLIGHT CONTROL SYSTEM AND METHOD

BACKGROUND

Field of the Invention

The present invention generally relates to automatic headlight altering of a vehicle. More specifically, the present invention relates to a system that automatically alters the headlights of a host vehicle based on the location of a remote vehicle relative to the host vehicle.

Background Information

Conventional headlight activators/deactivators are known in the art. For example, one conventional device activates vehicle headlights whenever the windshield wipers of a vehicle are energized. Another conventional device activates and deactivates vehicle headlights whenever ambient light conditions fall below or exceed predetermined values. That is, the headlights will be automatically activated when a certain level of darkness is reached and will be automatically deactivated when a certain level of lightness is reached.

Accordingly, to further encourage proper use of vehicle headlights, a need exists for an improved vehicle headlight system.

SUMMARY

It has been discovered that to improve vehicle headlight systems, a system may include the capability of determining whether the light output of a host should be altered so as to not affect the driver of an oncoming remote vehicle. In one disclosed embodiment, a vehicle headlight control method comprises generating host vehicle information with a positioning system, the host vehicle information including a host vehicle location and a host vehicle trajectory, receiving remote vehicle information with a receiver, the remote vehicle information including a remote vehicle location and remote vehicle trajectory, calculating a remote vehicle distance from the host vehicle location with a controller based on the remote vehicle information and the host vehicle information, determining with the controller whether the remote vehicle distance is less than a predetermined distance, and automatically operating with the controller a headlight of the host vehicle in a first setting while the remote vehicle distance is determined to be less than the predetermined distance.

In another disclosed embodiment, a vehicle headlight control system comprises a headlight, a positioning system, a receiver, and a controller. The positioning system is configured to generate host vehicle information including a host vehicle location and a host vehicle trajectory. The receiver is configured to receive remote vehicle information including a remote vehicle location and a remote vehicle trajectory. The controller is configured to calculate a remote vehicle distance from the host vehicle location based on the remote vehicle information and the host vehicle information, determine whether the remote vehicle distance is less than a predetermined distance, and automatically operate the headlight in a first setting while the remote vehicle distance is determined to be less than the predetermined distance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
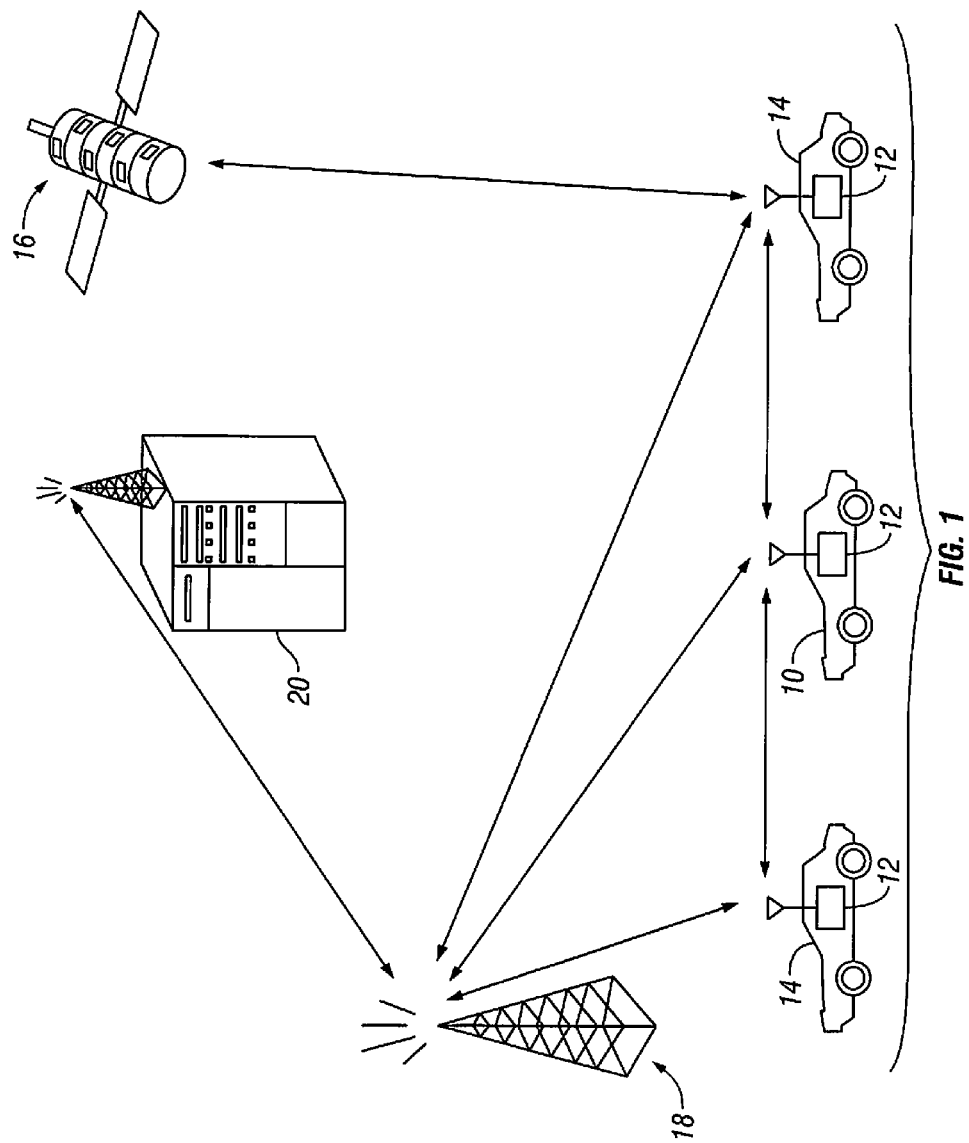
FIG. 1 is a block diagram illustrating an example of a host vehicle equipped with an vehicle headlight control system according to embodiments disclosed herein in relation to remote vehicles and components of a wireless communication network.

FIG. 1 is a block diagram illustrating a host vehicle (HV) 10 that is equipped with a vehicle headlight control system 12 according to a disclosed embodiment that can alter a light setting on the host vehicle 10, as discussed herein. In one embodiment, the vehicle headlight control system 12 is part of (or included in) a vehicle control system that can control several aspects of the vehicle using a controller. The vehicle headlight control system 12 communicates with at least one remote vehicle (RV) 14 that can also include a vehicle headlight control system 12.

The vehicle headlight control system 12 of the host vehicle 10 and the remote vehicle 14 communicate with a two-way wireless communications network. As seen in FIG. 1, for example, the two-way wireless communications network can include one or more global positioning satellites 16 (only one shown), and one or more terrestrial units, such as roadside (terrestrial) units 18 (two are shown), and a base station or external server 20. The global positioning satellites 16 and the roadside units 18 send and receive signals to and from the vehicle headlight control system 12 of the host vehicle 10 and the remote vehicles 14. The base station 20 sends and receives signals to and from the vehicle headlight control system 12 of the host vehicle 10 and the remote vehicles 14 via a network of the roadside units 18, or any other suitable two-way wireless communications network.

Figure 2:
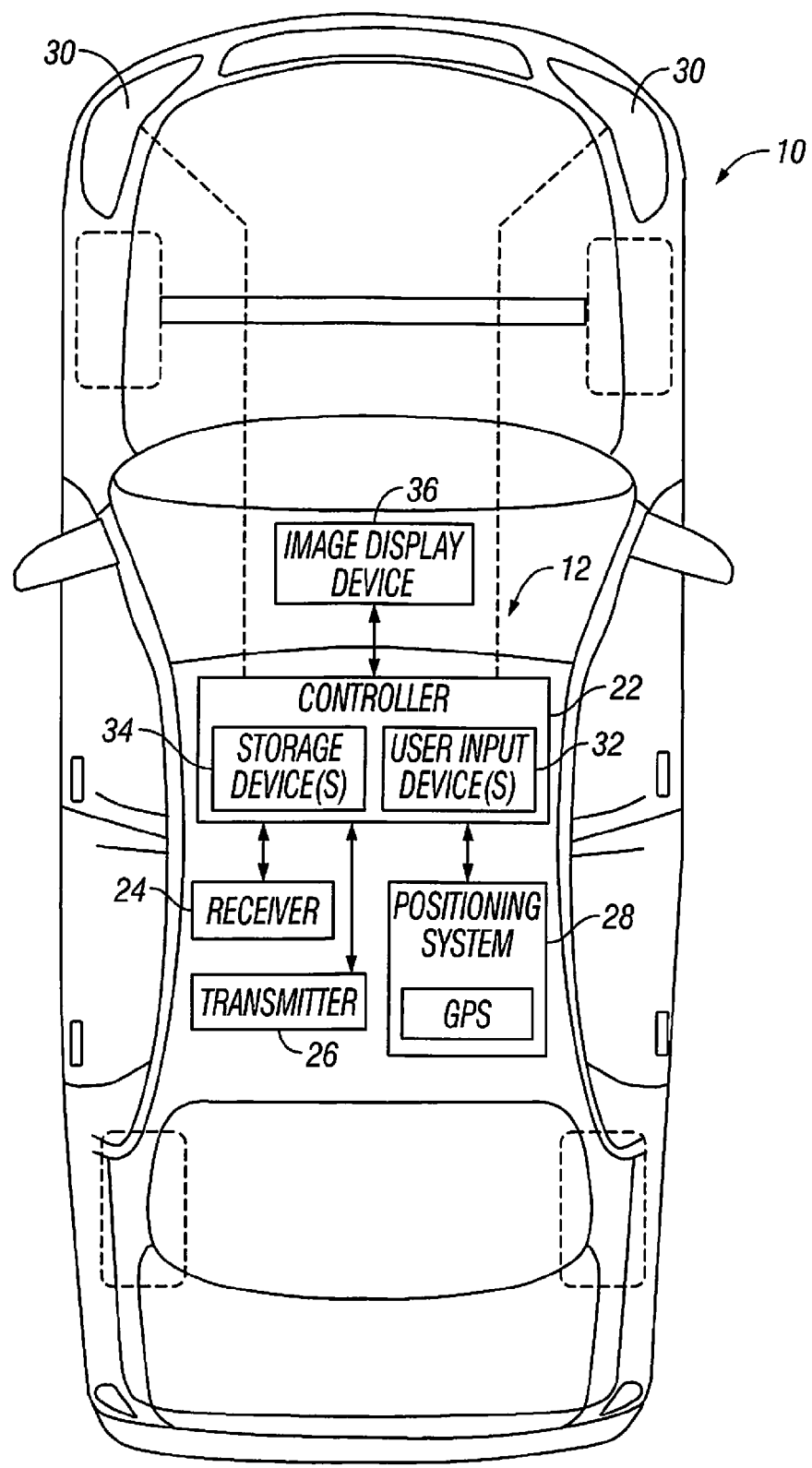
FIG. 2 is a block diagram of exemplary components of the host vehicle equipped with a vehicle headlight control system according to embodiments disclosed herein.

As shown in more detail in FIG. 2, the vehicle headlight control system 12 includes a controller 22, a receiver 24, a transmitter 26, a vehicle positioning system 28 and at least one headlight 30. The controller 22 preferably includes a microcomputer with a control program that controls the components of the vehicle headlight control system 12 as discussed below. The controller 22 includes other conventional components such as an input interface circuit, an output interface circuit, and storage devices 34 such as a ROM (Read Only Memory) device and a RAM (Random Access Memory) device. The microcomputer of the controller 22 is at least programmed to control the vehicle headlight control system 12 in accordance with the flow chart of FIGS. 11 and 12 discussed below. It will be apparent to those skilled in the art from this disclosure that the precise structure and algorithms for the controller 22 can be any combination of hardware and software that will carry out the functions of the present invention. Furthermore, the controller 22 can communicate with the other components of the vehicle headlight control system 12 discussed herein via, for example a controller area network (CAN) bus or in any other suitable manner as understood in the art. Additionally, as is understood, each of the components described herein can be included in a single integrated controller or device that is capable of performing each of the functions described herein.

As shown in more detail in FIG. 2, the controller 22 can include or be in communication with user input devices 32. The user input devices 32 can include, for example, a human-machine interface (HMI) which enables a user (e.g., the driver and/or passenger) to interact with the vehicle headlight control system 12 as understood in the art and discussed herein. The controller 22 can further include or be in communication with one or more storage devices 34 which can store information as discussed herein.

As further shown in FIG. 2, the vehicle headlight control system 12 in this example includes or is in communication with the vehicle positioning system 28. The vehicle positioning system 28 can be, for example, a global positioning system (GPS) positioning system or any other suitable type of positioning system, as known in the art. The vehicle positioning system 28 includes, for example, a communication device, such as a GPS communication device that communicates with the GPS satellites 16. The communication device can also communicate with one or more terrestrial units 18 and a base station or external server 20 to obtain host vehicle 10 information, including host vehicle 10 elevation, host vehicle 10 location, host vehicle 10 direction/trajectory, and any other suitable information. Furthermore, the vehicle positioning system 28 in this example includes or is in communication with the storage device 34 that can store map data and other location related data as understood in the art.

The vehicle headlight control system 12 in this example also includes or is in communication with the receiver 24 and the transmitter 26. In this embodiment, the receiver 24 and the transmitter 26 are shown as separate devices; however, the receiver 24 and transmitter 26 can be combined as a transceiver or any other suitable device(s). As understood in the art, the receiver 24 receives data or information from the remote vehicles 14, while the transmitter 26 transmits data or information to the remote vehicles 14 within a communication range of the host vehicle 10 to exchange vehicle data between the host vehicle 10 and the remote vehicles 14. This vehicle information received from a remote vehicle 14 and transmitted to the remote vehicle 14 can include information pertaining to the location of the host vehicle 10 and remote vehicle 14, the speed of the host vehicle 10 and the remote vehicle 14, the trajectory/direction of the host vehicle 10 and the remote vehicle 14, the elevation of the host vehicle 10 and the remote vehicle 14, information such as acceleration information, braking information, turn signal information and so on which indicates whether the host vehicle 10 and/or the remote vehicle 14 is preparing to turn or change lanes, and any additional information that can enable the vehicle headlight control system 12 to ascertain the location, current movement, and expected movement of the remote vehicle 14 and host vehicle 10.

The vehicle headlight control system 12 in this example further includes or is in communication with an image display device 36 that displays, for example, navigation information which indicates the location of the host vehicle 10 with respect to a map as understood in the art and/or the location or the remote vehicle 14 relative to the host vehicle 10, among other desired or suitable information.

FIGS. 3-10 illustrate scenarios in which a remote vehicle 14 is approaching a host vehicle 10 from a direction (e.g., the opposite direction) and the high beams of the headlights 30 of the host vehicle 10 are activated. In this scenario, state laws dictate that the driver of the host vehicle 10 must alter the settings of the headlights 30 (e.g., dim the head lamps or change the direction of the headlights) when the remote vehicle 14 is within a certain distance from the host vehicle 10.

Based on the information transmitted by the remote vehicle 14 and received by the host vehicle 10, and the information generated by the host vehicle 10, the controller 22 calculates the distance of the remote vehicle 14 location from the host vehicle 10 location. In one embodiment, the host vehicle 10 information and the remote vehicle 14 information includes any suitable information, such as host vehicle 10 and remote vehicle 14 speed, acceleration, location, trajectory, elevation and turn signal status, as discussed herein. Thus, the controller 22 can determine if the remote vehicle 14 is traveling and will continue to travel along a trajectory that will cause the remote vehicle 14 to pass by the host vehicle 10 within a predetermined distance. If the controller 22 of the host vehicle 10 determines that the approaching remote vehicle 14 will pass by the host vehicle 10 within a predetermined distance (i.e., whether the remote vehicle 14 distance is less than a predetermined distance), the controller 22 of the host vehicle 10 automatically changes the setting of the headlights 30 when the remote vehicle 14 reaches a location within the predetermined distance (e.g., a distance prescribed by law for the current location or jurisdiction), in which the high beam headlights 30 must be dimmed or set at a predetermined setting. Thus, the controller 22 automatically operates a headlight 30 of the host vehicle 10 in a first setting while the remote vehicle 14 distance is determined to be less than the predetermined distance. Moreover, in one embodiment the predetermined distance can be any suitable distance determined by the controller 22 or stored in the storage device.

In one embodiment, as the host vehicle 10 travels in a direction, the host vehicle 10 may encounter a remote vehicle 14 approaching from the opposite direction. In this scenario, the host vehicle high beam headlights 30 are on. As the remote vehicle 14 comes into range, the host vehicle 10 receives messages from the remote vehicle 14 providing the vehicle information discussed herein.

The controller 22 of the host vehicle 10 uses this information in addition to similar information available in the host vehicle 10 to determine or calculate the distance and rate of approach of the remote vehicle 14. Additionally, an algorithm on board the host vehicle 10 determines from the current location of the host vehicle 10, the local statute for altering the state of the headlights 30 (i.e., the local statute regarding high beam usage). The host vehicle 10 uses this information to automatically change the setting of the headlights 30 when the remote vehicle 14 reaches the predetermined distance from the host vehicle 10. In one embodiment, the driver of the host vehicle 10 is able to override the automatic change of the setting of the headlights 30 by cycling a high beam switch from on then off and then back on again, or in any other suitable manner.

In one embodiment, the controller 22 is configured to dim the headlights 30 when the remote vehicle 14 reaches the predetermined distance from the host vehicle 10. That is, the controller 22 is configured to change the setting of the headlight(s) from high beam to low beam. Alternatively, in one embodiment, when host vehicle 10 is equipped with an adaptive front lighting system, rather than or in addition to dimming the headlights, the host vehicle 10 uses the information provided in the local statute and the host vehicle 10 and remote vehicle 14 information to determine that it is necessary to automatically divert the headlights 30 away from the remote vehicle 14 when the remote vehicle 14 reaches the predetermined distance from the host vehicle 10.

In the examples, shown in FIGS. 3-10, the host vehicle 10 and the remote vehicle 14 are shown in specific directions and positions relative to each other and relative to known latitude and longitude. In each of these examples, $\phi_{HV}$ can represent the latitude of the host vehicle 10, $\theta_{HV}$ represents the longitude of the host vehicle 10, $\phi_{RV}$ can represent the latitude of the remote vehicle 14 and $\theta_{RV}$ represents the longitude of the remote vehicle 14. All of the values for the latitude and longitude can be expressed in radians. Also, $\delta_{HV}$ can represent the heading of the host vehicle 10, and $\delta_{RV}$ can represent the heading of the remote vehicle 14.

As discussed above, information (e.g., position, elevation and direction) from the host vehicle 10 can be generated based on the positioning system 28, and the information (e.g., position, elevation and direction) from the remote vehicle 14 can be received via the receiver 24. For heading, the convention used is as follows: 0 degrees for north, $\pi/2$ (90 degrees) for east, $\pi$ (108 degrees) for south, and $3\pi/2$ (270 degrees) for west. Also, the angle $\beta_1$ represents the angle between the direction of the host vehicle 10 $\delta_{HV}$ and the angle between a straight line from the host vehicle 10 and the remote vehicle 14 and the direction of the host vehicle 10.

Figure 3:
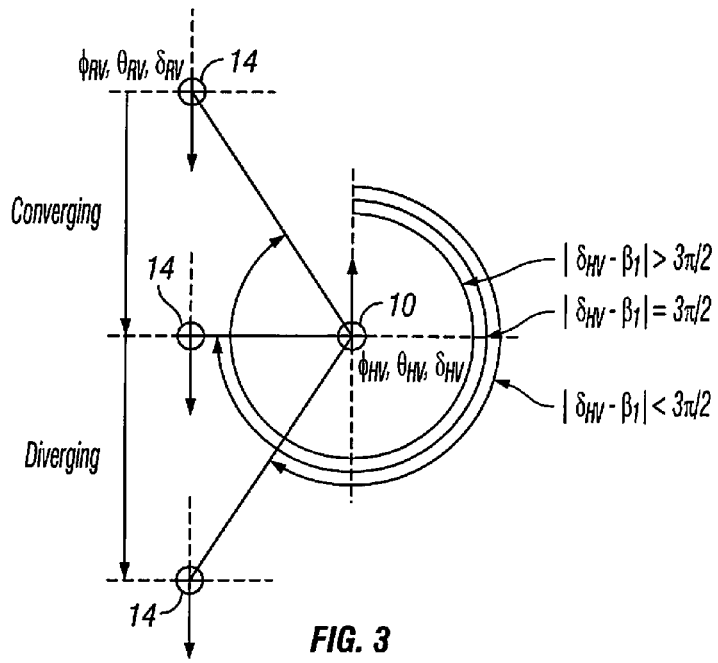
FIG. 3 is a schematic diagram showing a host vehicle and a remote vehicle converging as the host vehicle travels north.

Thus, as specifically shown in FIG. 3, the host vehicle 10 is traveling in a northerly direction and the remote vehicle 14 is traveling in a southerly direction. Initially, the absolute value of the difference between the host vehicle 10 heading angle, $\delta_{HV}$ and $\beta_1$ is greater than $3\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $3\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $3\pi/2$ radians, the controller 22 determines based on the information generated by the host vehicle 10 and received by the remote vehicle 14 whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting. In one embodiment, the setting can remain until the driver of the host vehicle 10 alters the setting to the second setting.

Figure 4:
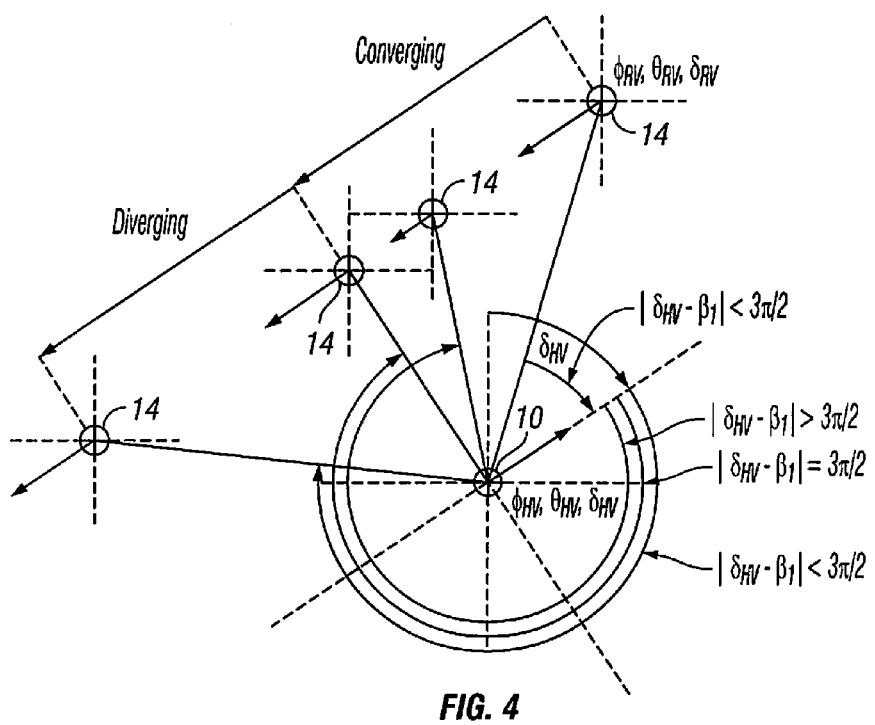
FIG. 4 is a schematic diagram showing a host vehicle and a remote vehicle converging as the host vehicle travels northeast.

As shown in FIG. 4, the host vehicle 10 is traveling in a northeasterly direction while the remote vehicle 14 is traveling in a southwesterly direction. Initially, the absolute value of the difference between the host vehicle 10 heading angle, $\delta_{HV}$ and $\beta_1$ is less than $3\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $3\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $3\pi/2$ radians, the controller 22 determines based on the information generated by the host vehicle 10 and received by the remote vehicle 14 whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting.

Figure 5:
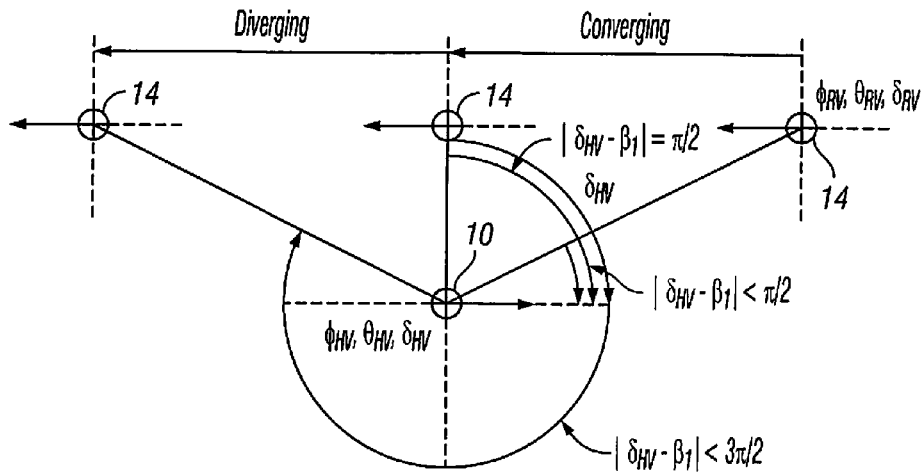
FIG. 5 is a schematic diagram showing a host vehicle and a remote vehicle converging as the host vehicle travels east.

As shown in FIG. 5, the host vehicle 10 is traveling in a easterly direction while the remote vehicle 14 is traveling in an westerly direction. Initially, the absolute value of the difference between the host vehicle 10 heading angle, $\delta_{HV}$ and $\beta_1$ is less than $\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is greater than $\pi/2$ and less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $\pi/2$ radians, the controller 22 determines based on the information generated by the host vehicle 10 and received by the remote vehicle 14 whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes greater than $\pi/2$ and less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting. In one embodiment, the setting can remain until the driver of the host vehicle 10 alters the setting to the second setting.

Figure 6:
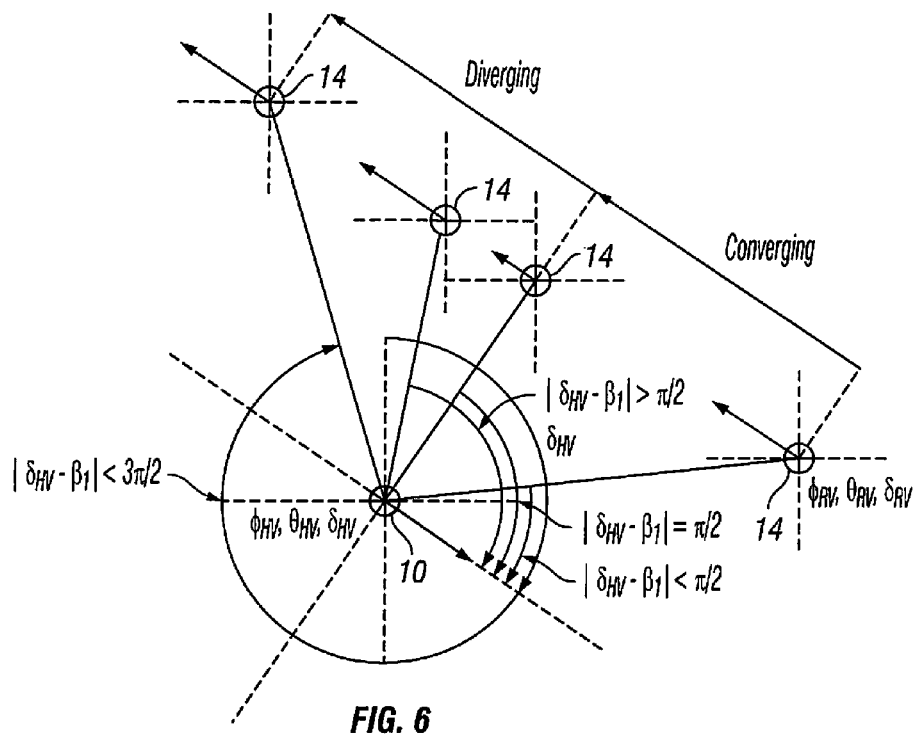
FIG. 6 is a schematic diagram showing a host vehicle and a remote vehicle converging as the host vehicle travels southeast.

As shown in FIG. 6, the host vehicle 10 is traveling in a southeasterly direction while the remote vehicle 14 is traveling in a northwesterly direction. Initially, the absolute value of the difference between the host vehicle 10 heading angle, $\delta_{HV}$ and $\beta_1$ is less than $\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is greater than $\pi/2$ and less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $\pi/2$ radians, the controller 22 determines based on the information generated by the host vehicle 10 and received by the remote vehicle 14 whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes greater than $\pi/2$ and less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting. In one embodiment, the setting can remain until the driver of the host vehicle 10 alters the setting to the second setting.

Figure 7:
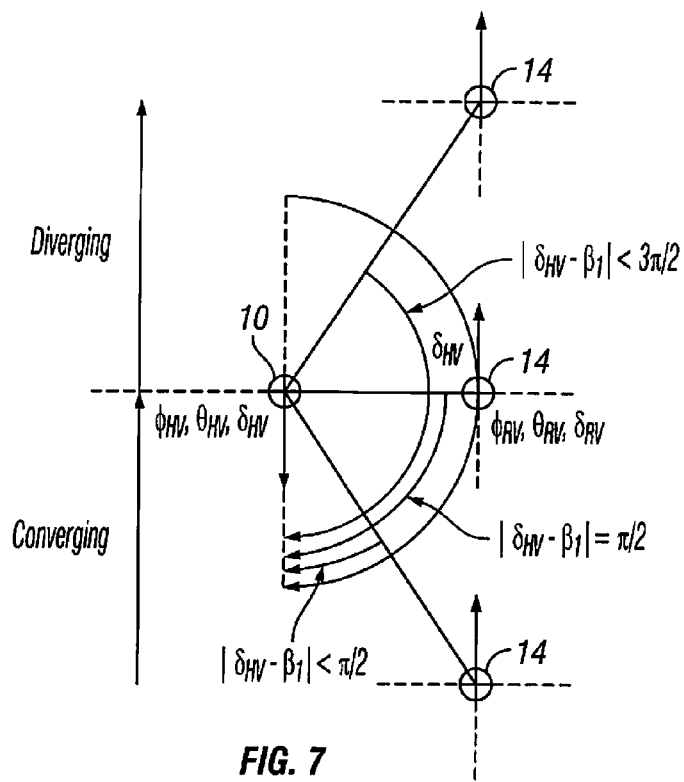
FIG. 7 is a schematic diagram showing a host vehicle and a remote vehicle converging as the host vehicle travels south.

As shown in FIG. 7, the host vehicle 10 is traveling in a southerly direction while the remote vehicle 14 is traveling in a northerly direction. Initially the absolute value of the difference between the host vehicle 10 heading angle, $\delta_{HV}$ and $\beta_1$ is less than $\pi/2$ radians as the paths of the two vehicles converge toward one another. Then as the host vehicle 10 and the remote vehicle 14 converge, the absolute value of the difference between the host vehicle 10 heading angle, $\delta_{HV}$ and $\beta_1$ approaches $\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is greater than $\pi/2$ and less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $\pi/2$ radians, the controller 22 determines, based on the information generated by the host vehicle 10 and received by the remote vehicle 14, whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and their paths begin to diverge (i.e., the absolute value of the difference between the host vehicle 10 heading angle, $\delta_{HV}$ and $\beta_1$ becomes greater than $\pi/2$ and less than $3\pi/2$ radians), the controller 22 can return the headlight 30 setting to the second setting, i.e., so as to emit light at a higher intensity than a first setting, or the controller 22 can cause the headlight 30 to emit light in a direction that is further away from the remote vehicle 14 location than a first setting. In one embodiment, the setting can remain until the driver of the host vehicle 10 alters the setting to the second setting.

Figure 8:
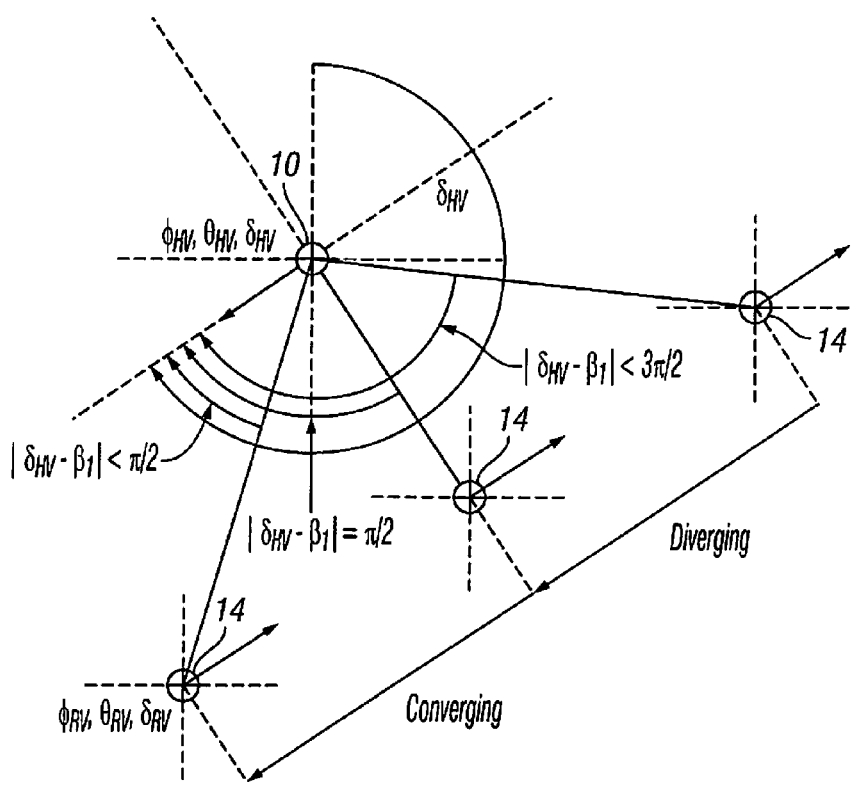
FIG. 8 is a schematic diagram showing a host vehicle and a remote vehicle converging as the host vehicle travels southwest.

As shown in FIG. 8, the host vehicle 10 is traveling in a southwesterly direction while the remote vehicle 14 is traveling in a northeasterly direction. Initially, the absolute value of the difference between the host vehicle 10 heading angle, $\delta_{HV}$ and $\beta_1$ is less than $\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is greater than $\pi/2$ and less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $\pi/2$ radians, the controller 22 determines, based on the information generated by the host vehicle 10 and received by the remote vehicle 14, whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes greater than $\pi/2$ and less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting. In one embodiment, the setting can remain until the driver of the host vehicle 10 alters the setting to the second setting.

Figure 9:
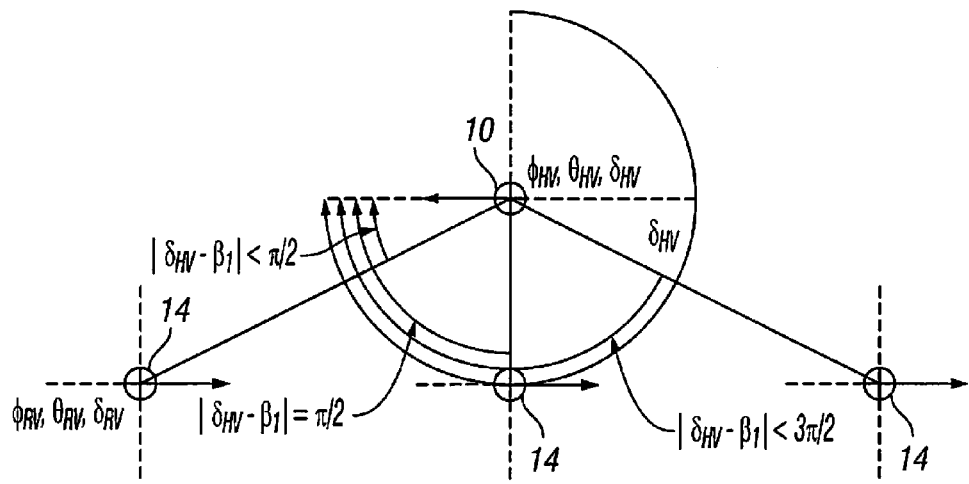
FIG. 9 is a schematic diagram showing a host vehicle and a remote vehicle converging as the host vehicle travels west.

As shown in FIG. 9, the host vehicle 10 is traveling in a westerly direction while the remote vehicle 14 is traveling in a easterly direction. Initially, the absolute value of the difference between the host vehicle 10 heading angle, $\delta_{HV}$ and $\beta_1$ is less than $\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is greater than $\pi/2$ and less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $\pi/2$ radians, the controller 22 determines based on the information generated by the host vehicle 10 and received by the remote vehicle 14 whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes greater than $\pi/2$ and less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting. In one embodiment, the setting can remain until the driver of the host vehicle 10 alters the setting to the second setting.

Figure 10:
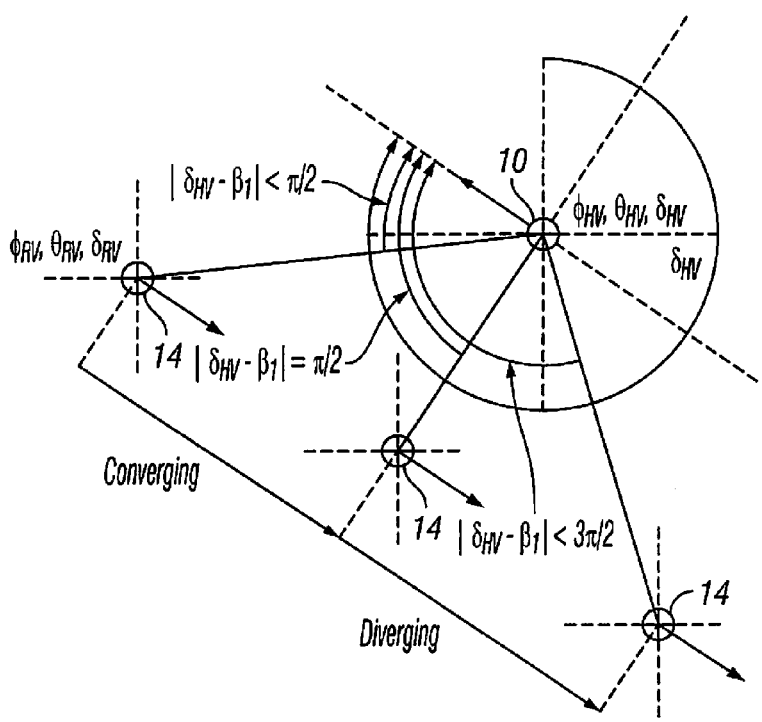
FIG. 10 is a schematic diagram showing a host vehicle and a remote vehicle converging as the host vehicle travels northwest.

As shown in FIG. 10, the host vehicle 10 is traveling in a northwesterly direction while the remote vehicle 14 is traveling in a southeasterly direction. Initially, the absolute value of the difference between the host vehicle 10 heading angle, $\delta_{HV}$ and $\beta_1$ is less than $\pi/2$ radians as the paths of the two vehicles converge toward one another. Then, as the host vehicle 10 and the remote vehicle 14 converge, the absolute value of the difference between the host vehicle 10 heading angle, $\delta_{HV}$ and $\beta_1$ approaches $\pi/2$ radians, which is the absolute value of the difference between the host vehicle 10 heading angle, $\delta_{HV}$ and $\beta_1$, at the moment the remote vehicle 14 and the host vehicle 10 pass each other in this example. After the vehicles pass each other, the absolute value of the difference between the host vehicle 10 heading angle, $\delta_{HV}$ and $\beta_1$ is greater than $\pi/2$ and less than $3\pi/2$ radians as the paths of the two vehicles diverge.

Accordingly, in this example, as the remote vehicle 14 and the host vehicle 10 approach positions in which the absolute value of the difference between the host vehicle 10 heading angle, $\delta_{HV}$ and $\beta_1$ is $\pi/2$ radians, the controller 22 determines based on the information generated by the host vehicle 10 and received by the remote vehicle 14 whether the vehicles will converge to be within a predetermined distance (e.g., a distance that is less than or equal to a distance that is the distance prescribed by the local jurisdiction for altering a setting of the headlights) using the latitude and longitude information of each vehicle, and whether the vehicles are converging. When the controller 22 determines that the host vehicle 10 and the remote vehicle 14 are on a converging path and will converge to be within a predetermined distance, the controller 22 alters a setting on the headlights 30 from a second setting to a first setting when the host vehicle 10 and the remote vehicle 14 converge to be within the predetermined distance. For example, the controller 22 can alter the headlight 30 so as to emit light at a lower intensity than a second setting, or the controller 22 can cause the headlight 30 to emit light in a direction that is further away from the remote vehicle 14 location than a second setting.

Moreover, once the remote vehicle 14 and the host vehicle 10 pass each other, and the controller 22 determines that their paths are beginning to diverge (i.e., the absolute value of the difference between the host vehicle 10 heading angle, $\delta_{HV}$ and $\beta_1$ becomes greater than $\pi/2$ and less than $3\pi/2$ radians), the controller 22 can return the headlight 30 setting to the second setting, i.e., so as to emit light at a higher intensity than a first setting, or the controller 22 can cause the headlight 30 to emit light in a direction that is closer to the original remote vehicle 14 location than the first setting. In one embodiment, the setting can remain until the driver of the host vehicle 10 alters the setting to the second setting.

From these examples it can be seen that for any configuration, when the paths of the host vehicle 10 and remote vehicle 14 are converging, if the absolute value of the difference between the host vehicle 10 heading angle, $\delta_{HV}$ and $\beta_1$ is either less than $\pi/2$ radians or greater than $3\pi/2$ radians. Conversely, the paths of the two vehicles are diverging if the absolute value of the difference between the host vehicle 10 heading angle, $\delta_{HV}$ and $\beta_1$ is either greater than $\pi/2$ radians or less than $3\pi/2$ radians thus:

Converging paths: $|\delta_{HV}-\beta_1|<\pi/2$ or $|\delta_{HV}-\beta_1|>3\pi/2$ Diverging paths: $|\delta_{HV}-\beta_1|>\pi/2$ or $|\delta_{HV}-\beta_1|<3\pi/2$ The converging path condition is expressed mathematically as follows:

$$B = \frac{1}{2}\left[\frac{(1/2-\varphi)\pi - |\delta_{HV}-\beta_1| + \sigma}{|(1/2-\varphi)\pi - |\delta_{HV}-\beta_1|| + \sigma} + 1\right] +$$

$$\frac{1}{2}\left[\frac{|\delta_{HV}-\beta_1| - (3/2-\varphi)\pi + \sigma}{||\delta_{HV}-\beta_1| - (3/2-\varphi)\pi| + \sigma} + 1\right]$$

φ is used to define a minimum value for the upper and lower limits for the threshold angles; and σ is a constant added to the equation to prevent dividing by 0.

To determine whether the host vehicle 10 and remote vehicle 14 are converging along a path from opposing directions the following expression is used.

$$\Delta_3 = \frac{1}{2}\left[\frac{|\delta_{HV}-\delta_{RV}| - (1-\varphi)\pi + \sigma}{||\delta_{HV}-\delta_{RV}| - (1-\varphi)\pi| + \sigma} + 1\right] \times \frac{1}{2}\left[\frac{(1+\varphi)\pi - |\delta_{HV}-\beta_1| + \sigma}{|(1+\varphi)\pi - |\delta_{HV}-\beta_1|| + \sigma} + 1\right]$$

where φ is used to define a ±range to either side of the reference angle value of π radians.

Multiplying B and $\Delta_3$ results in the following expression:

$$C_9 = B \times \Delta_3$$

When $C_9$ is equal to 1, the host vehicle 10 and remote vehicle 14 are converging along a path from opposing directions. Accordingly, as discussed above, once the controller 22 determines the host vehicle 10 and remote vehicle 14 are converging along a path from opposing directions, and the distance between the host vehicle 10 and remote vehicle 14 is within a predetermined distance, the controller 22 can alter the setting of the headlights.

Figure 11:
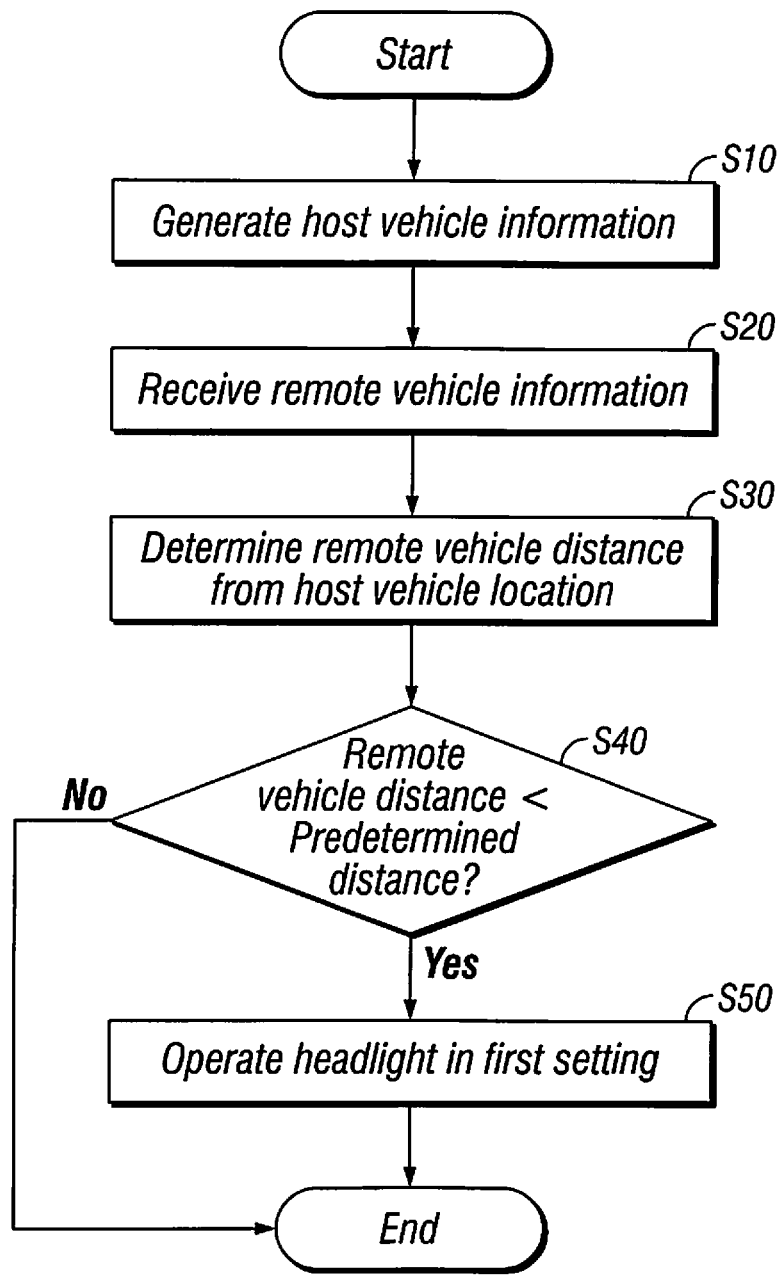
FIG. 11 is a flow chart illustrating a method according to one embodiment.

FIG. 11 illustrates a method of implementing an embodiment described herein. First, in step S10, the host vehicle 10 through various systems generates host vehicle 10 information. The host vehicle 10 information can include information pertaining to the location of the host vehicle 10, the elevation of the host vehicle 14, the speed of the host vehicle 10, the trajectory of the host vehicle 10, information such as braking information, turn signal information and so on which indicates an expected movement of the host vehicle such as whether the host vehicle 10 is preparing to turn or change lanes, and any additional information that can enable the vehicle headlight control system 12 to ascertain the location, current movement, and expected movement of the host vehicle 10. The receiver 24 then receives the remote vehicle 14 information in step S20. The remote vehicle 14 information can include information pertaining to the location of the remote vehicle 14, the elevation of the remote vehicle 14, the speed of the remote vehicle 14, the trajectory of the remote vehicle 14, information such as braking information, turn signal information and so on which indicates an expected movement of the remote vehicle 14 such as whether the remote vehicle 14 is preparing to turn or change lanes, and any additional information that can enable the vehicle headlight control system 12 to ascertain the location, current movement, and expected movement of the remote vehicle 14. In step S30, controller 22 then determines the remote vehicle 14 distance relative to the host vehicle 10. In step S40, the controller 22 compares the remote vehicle 14 distance to a predetermined distance to determine whether the remote vehicle 14 is positioned at a distance less than the predetermined distance. If the remote vehicle 14 determines that the remote vehicle 14 is positioned greater than or equal to the predetermined distance, the vehicle headlight control system 12 does not alter a setting of the headlights. However, if the controller 22 determines that the remote vehicle 14 is positioned at a distance less than the predetermined distance, the controller 22 alters a setting of the headlights, for example to operate in a first setting (e.g. a low beam setting or a redirected beam setting).

Figure 12:
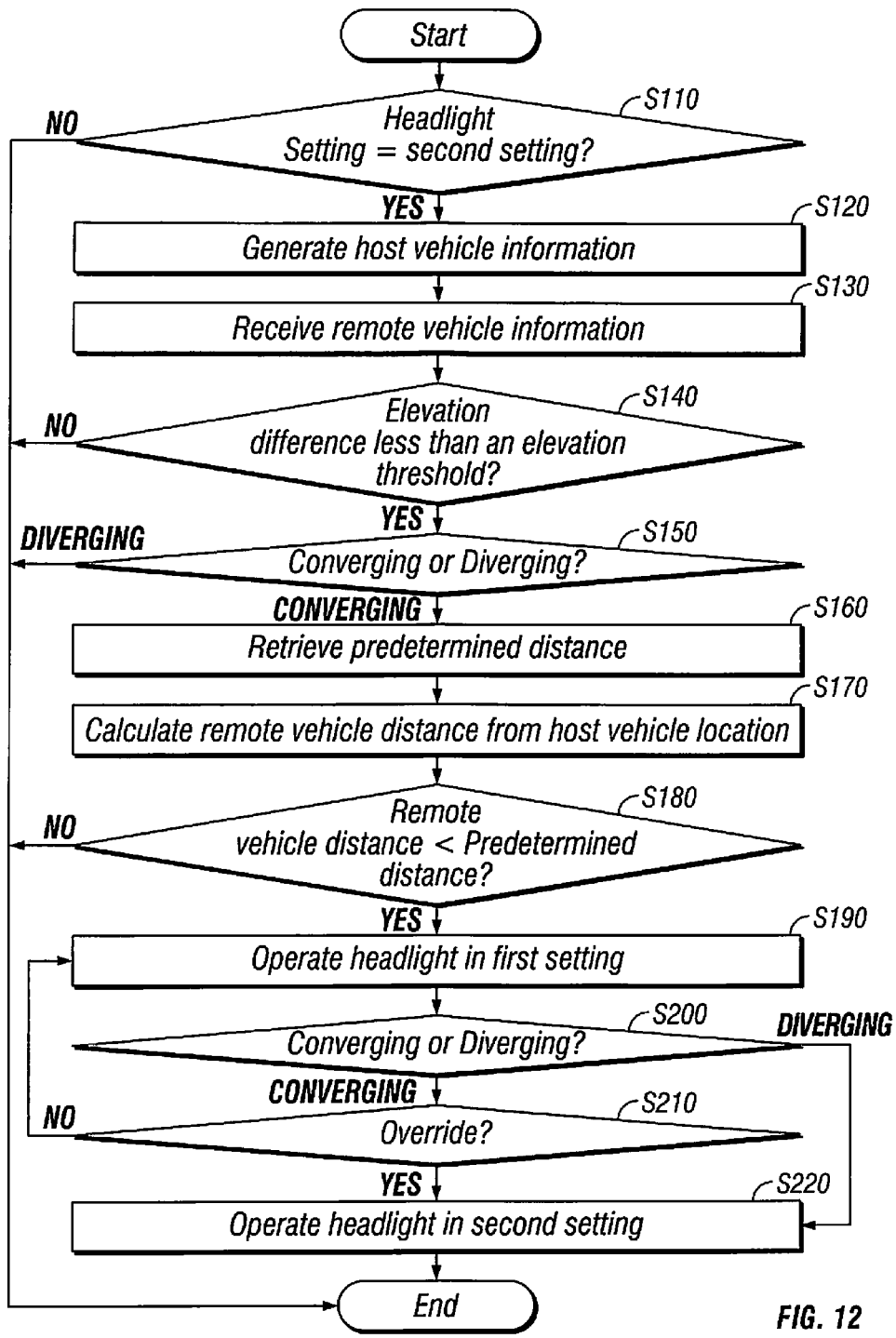
FIG. 12 is a flow chart illustrating a method according to one embodiment.

FIG. 12 illustrates a method of implementing an embodiment described herein. First, in step S110, the controller 22 of the vehicle headlight control system 12 determines a set operating state of the headlight. If the controller 22 determines in step S110 that the headlight 30 is operating in a first setting (e.g. a low beam setting or a redirected beam setting), the method proceeds to the end since altering the setting of the headlight 30 would be unnecessary. If the controller 22 determines in step S110 that the headlight 30 is operating in the second setting (e.g. a high beam setting or a forward directed setting), the method proceeds to generate the host vehicle information in step S120 and receive the remote vehicle information 14, as discussed herein.

Based on the host vehicle information generated by the host vehicle 10 in step S120 and the remote vehicle information received by the host vehicle 10 from the remote vehicle 14 in step S130, as discussed herein, the controller 22 determines in step S140 whether the elevation difference between the host vehicle 10 and the remote vehicle 14 is less than an elevation threshold. When the controller 22 determines in step S140 that the elevation difference is greater than the elevation threshold, the method proceeds to the end since altering the setting of the headlight 30 would be unnecessary. Thus, when the host vehicle 10 is on, for example, on an overpass or a portion of the road that is higher than the remote vehicle 14, the controller 22 determines that it is not necessary to alter the setting of the headlights 30. However, when the controller 22 determines the elevation difference is less than the elevation threshold, the method proceeds to step S150.

In step S150, the controller 22 determines, using the procedure described herein, whether the host vehicle 10 and the remote vehicle 14 are on a converging path or a diverging path. When the host vehicle 10 and the remote vehicle 14 are diverging, the method proceeds to the end since altering the setting of the headlight 30 would be unnecessary. When the host vehicle 10 and the remote vehicle 14 are converging, the method proceeds to step S160.

In step S160, the controller 22 retrieves information related to the predetermined distance. As discussed herein, the information related to the predetermined distance can be the distance mandated by the local authorities or a specific jurisdiction and stored in a storage device in the host vehicle 10, and the controller 22 can determine the pertinent distance based on the host vehicle 10 location information. Additionally, the information related to the predetermined distance can be stored remotely and the information may be received via wireless communication. Furthermore, the predetermined distance can be a default distance, such as the distance mandated by the strictest known local authority. The method then proceeds to step S170 in which the controller 22 calculates the remote vehicle 14 distance from the host vehicle 10 location using any of the procedures described herein, and then the controller 22 compares the remote vehicle 14 distance to the predetermined distance, in step S180, to determine whether the remote vehicle 14 is positioned at a distance less than the predetermined distance. If the remote vehicle 14 determines that the remote vehicle 14 is positioned greater than or equal to the predetermined distance, the method proceeds to the end since altering the setting of the headlight 30 would be unnecessary. However, if the controller 22 determines that the remote vehicle 14 is positioned at a distance less than the predetermined distance, the controller 22 alters a setting of the headlights 30 to a first setting (e.g., a low beam setting or a redirected setting) in step S190. Thus, as is understood from FIG. 12, in one embodiment, the controller 22 automatically operates the headlight 30 to alter the headlight 30 to operate in the first setting while the remote vehicle distance is less than the predetermined distance only when the host vehicle 10 information and the remote vehicle 14 information indicate a converging path, and only when the elevation difference is less than a predetermined elevation threshold.

In step S200, vehicle headlight control system 12 continues to monitor the remote vehicle information and continually determines whether the remote vehicle 14 and the host vehicle 10 are converging or diverging. When the controller determines in step S200 that the vehicles continue to converge, the controller 22 maintains the setting of the headlights 30 at the first setting. However, if the controller 22 determines in step S200 that the host vehicle 10 and the remote vehicle 14 are diverging, the controller 22 automatically restores operation of the headlight 30 to the second setting (i.e., the set operating state).

As shown in FIG. 12, while the controller 22 determines the vehicles are continuing to converge, the controller 22 can determine in step S210 whether the driver of the host vehicle 10 overrides the setting, in which case the controller 22 returns the operation of the headlight 30 to the second setting in step S220, in accordance with the driver's intent. Thus, when the controller 22 receives a user input signal from the user input device, the controller 22 automatically operates the headlight 30 to automatically return the headlight 30 to the second setting (i.e., the set operating state) even when the converging path is indicated, since the user input signal is an override signal. However, if the controller 22 determines in step S220 that the driver of the host vehicle 10 is not overriding the setting, the method returns to step S190 in which the controller 22 continues to operate the headlight 30 in the first setting.

As is understood the steps of any of the embodiments described herein may be performed in any order, additional steps may be added and/or steps be removed or omitted for any reason desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a vehicle equipped with the vehicle headlight control system and method.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle headlight control method comprising:
generating host vehicle information with a positioning system, the host vehicle information including a host vehicle location and a host vehicle trajectory;
receiving remote vehicle information with a receiver, the remote vehicle information including a remote vehicle location and a remote vehicle trajectory;
calculating a remote vehicle distance from the host vehicle location with a controller based on the remote vehicle information and the host vehicle information;
determining with the controller whether the host vehicle trajectory and the remote vehicle trajectory are such that the remote vehicle will pass by the host vehicle within a predetermined distance and whether the remote vehicle distance is less than the predetermined distance;
determining with the controller whether the host vehicle information and the remote vehicle information indicate a converging path or a diverging path based on the host vehicle trajectory and the remote vehicle trajectory by determining an absolute value of the difference between a heading angle of the host vehicle and an angle between a direction of the host vehicle and a straight line from the host vehicle to the remote vehicle; and
automatically operating with the controller a headlight of the host vehicle in a first setting while the remote vehicle distance is determined to be less than the predetermined distance and only when the converging path is indicated.

2. The method according to claim 1, further comprising detecting with the controller a set operating state of the headlight,
the automatically operating the headlight including automatically altering operation of the headlight from a second setting to the first setting when the set operating state of the headlight is detected as the second setting, and maintaining operation of the headlight in the first setting when the set operating state of the headlight is detected as the first setting.

3. The method according to claim 2, further comprising determining with the controller whether the host vehicle information and the remote vehicle information indicate a converging path or a diverging path based on the host vehicle trajectory and the remote vehicle trajectory,
the automatically operating the headlight including automatically returning the headlight to the set operating state when the diverging path is indicated.

4. The method according to claim 2, further comprising storing a previous remote vehicle distance in a storage unit,
the automatically operating the headlight including automatically altering operation of the headlight from a second setting to the first setting when the remote vehicle distance is less than the predetermined distance and the previous remote vehicle distance is greater than the predetermined distance.

5. The method according to claim 2, further comprising determining with the controller whether the host vehicle information and the remote vehicle information indicate a converging path or a diverging path based on the host vehicle trajectory and the remote vehicle trajectory; and
receiving with the controller a user input signal from a user input device,
the automatically operating the headlight including automatically returning the headlight to the set operating state when the converging path is indicated and the user input signal is an override signal.

6. The method according to claim 1, further comprising determining with the controller a jurisdiction corresponding to the host vehicle location; and
retrieving the predetermined distance with the controller from a storage unit.

7. The method according to claim 1, wherein
the host vehicle information further includes a host vehicle elevation, the remote vehicle information further includes a remote vehicle elevation, and the automatically operating the headlight includes determining an elevation difference between the host vehicle elevation and the remote vehicle elevation, and automatically operating the headlight in the first setting only when the elevation difference is less than a predetermined elevation threshold.

8. The method according to claim 1, wherein
operating the headlight in the first setting includes operating the headlight to emit light at a lower intensity than a second setting.

9. The method according to claim 1, wherein
operating the headlight in the first setting includes operating the headlight to emit light in a direction that is further away from the remote vehicle location than a second setting.

10. A vehicle headlight control system comprising:
a headlight;
a positioning system configured to generate host vehicle information including a host vehicle location and a host vehicle trajectory;
a receiver configured to receive remote vehicle information including a remote vehicle location and a remote vehicle trajectory; and
a controller configured to
calculate a remote vehicle distance from the host vehicle location based on the remote vehicle information and the host vehicle information,
determine whether the host vehicle trajectory and the remote vehicle trajectory are such that the remote vehicle will pass by the host vehicle within a predetermined distance and whether the remote vehicle distance is less than a predetermined distance, determine whether the host vehicle information and the remote vehicle information indicate a converging path based on a difference between a heading angle of the host vehicle and an angle between a direction of the host vehicle and a straight line from the host vehicle to the remote vehicle, and automatically operate the headlight in a first setting while the remote vehicle distance is determined to be less than the predetermined distance and only when the converging path is indicated.

11. The vehicle headlight control system according to claim 10, wherein the controller is further configured to detect a set operating state of the headlight, and automatically alter operation of the headlight from a second setting to the first setting when the set operating state of the headlight is detected as the second setting and the remote vehicle distance is determined to be less than the predetermined distance, and maintain operation of the headlight in the first setting when the set operating state of the headlight is detected as the first setting and the remote vehicle distance is determined to be less than the predetermined distance.

12. The vehicle headlight control system according to claim 11, wherein the controller is further configured to determine whether the host vehicle information and the remote vehicle information indicate a converging path or a diverging path based on the host vehicle trajectory and the remote vehicle trajectory, and automatically return the headlight to the set operating state when the diverging path is indicated.

13. The vehicle headlight control system according to claim 11, further comprising a storage unit, the controller being further configured to store a previous remote vehicle distance, and automatically alter operation of the headlight from a second setting to the first setting when the remote vehicle distance is less than the predetermined distance and the previous remote vehicle distance is greater than the predetermined distance.

14. The vehicle headlight control system according to claim 11, further comprising a user input device configured to provide a user input signal to the controller, the controller being further configured to determine whether the host vehicle information and the remote vehicle information indicate a converging path or a diverging path based on the host vehicle trajectory and the remote vehicle trajectory, and automatically return the headlight to the set operating state when the converging path is indicated and the user input signal is an override signal.

15. The vehicle headlight control system according to claim 10, further comprising a storage unit, the controller being further configured to determine a jurisdiction corresponding to the host vehicle location, and retrieve the predetermined distance from the storage unit.

16. The vehicle headlight control system according to claim 10, wherein the host vehicle information further includes a host vehicle elevation, the remote vehicle information further includes a remote vehicle elevation, and the controller is further configured to determine an elevation difference between the host vehicle elevation and the remote vehicle elevation, and automatically operate the headlight in the first setting only when the elevation difference is less than a predetermined elevation threshold.

17. The vehicle headlight control system according to claim 10, wherein the first setting includes operating the headlight to emit light at a lower intensity than a second setting.

18. The vehicle headlight control system according to claim 10, wherein the first setting includes operating the headlight to emit light in a direction that is further away from the remote vehicle location than a second setting.

* * * * *